Figure 1:
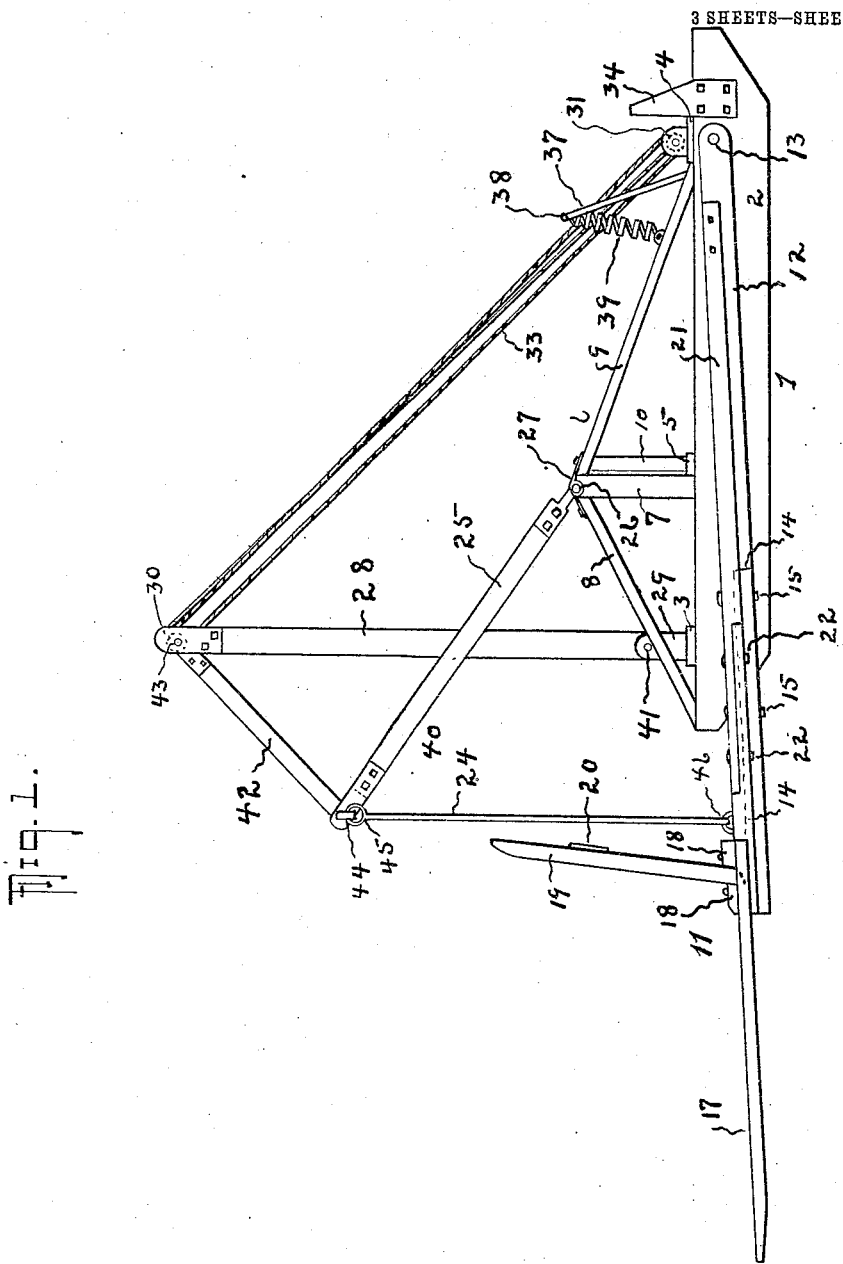

E. G. CARTER.
HAY STACKER.
APPLICATION FILED FEB. 25, 1909.

938,461.

Patented Nov. 2, 1909.
3 SHEETS—SHEET 1.

Witnesses
Arthur Sturges
Geo. Fenway

Inventor
Edward G. Carter
By Hiram A. Sturges,
Attorney

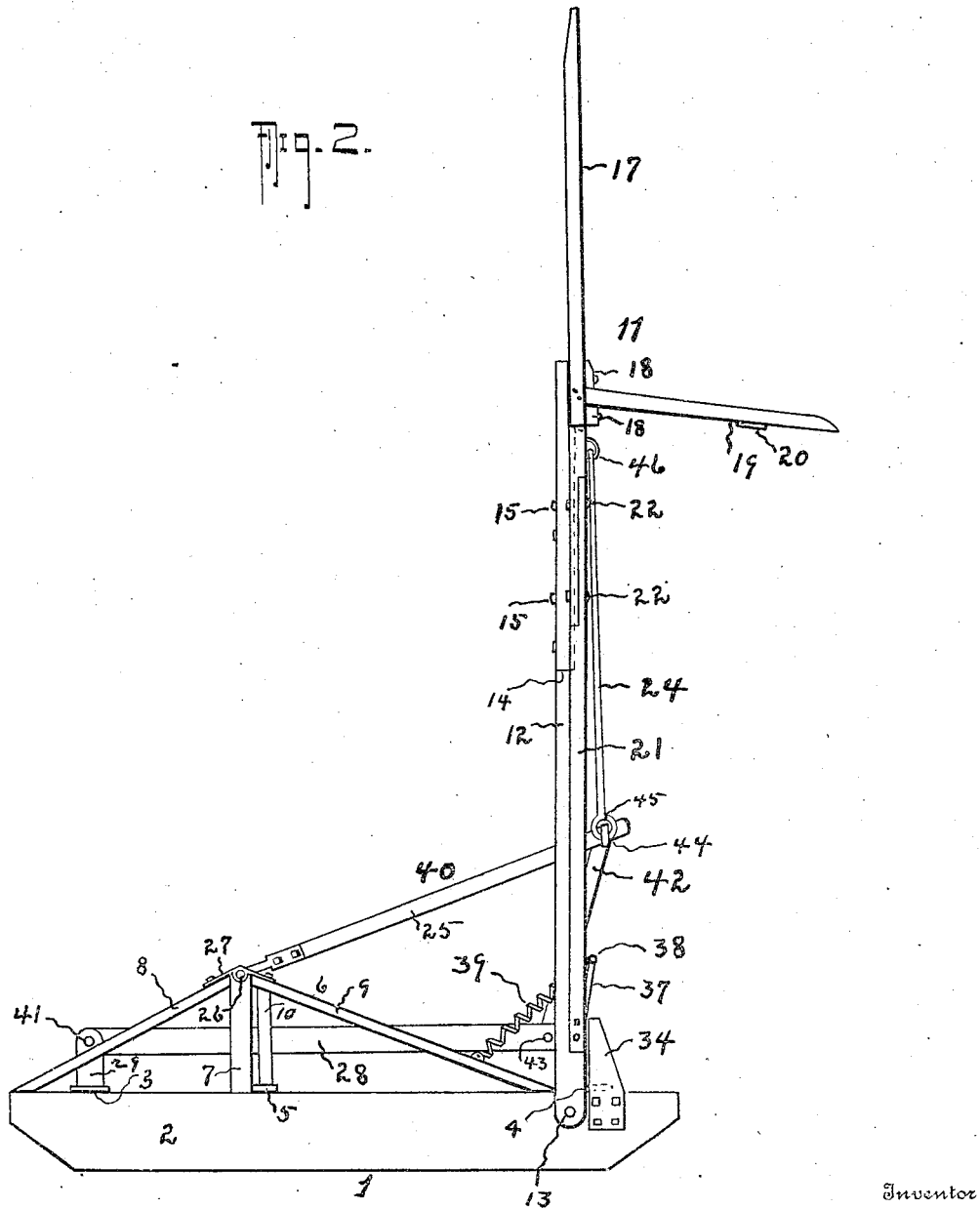

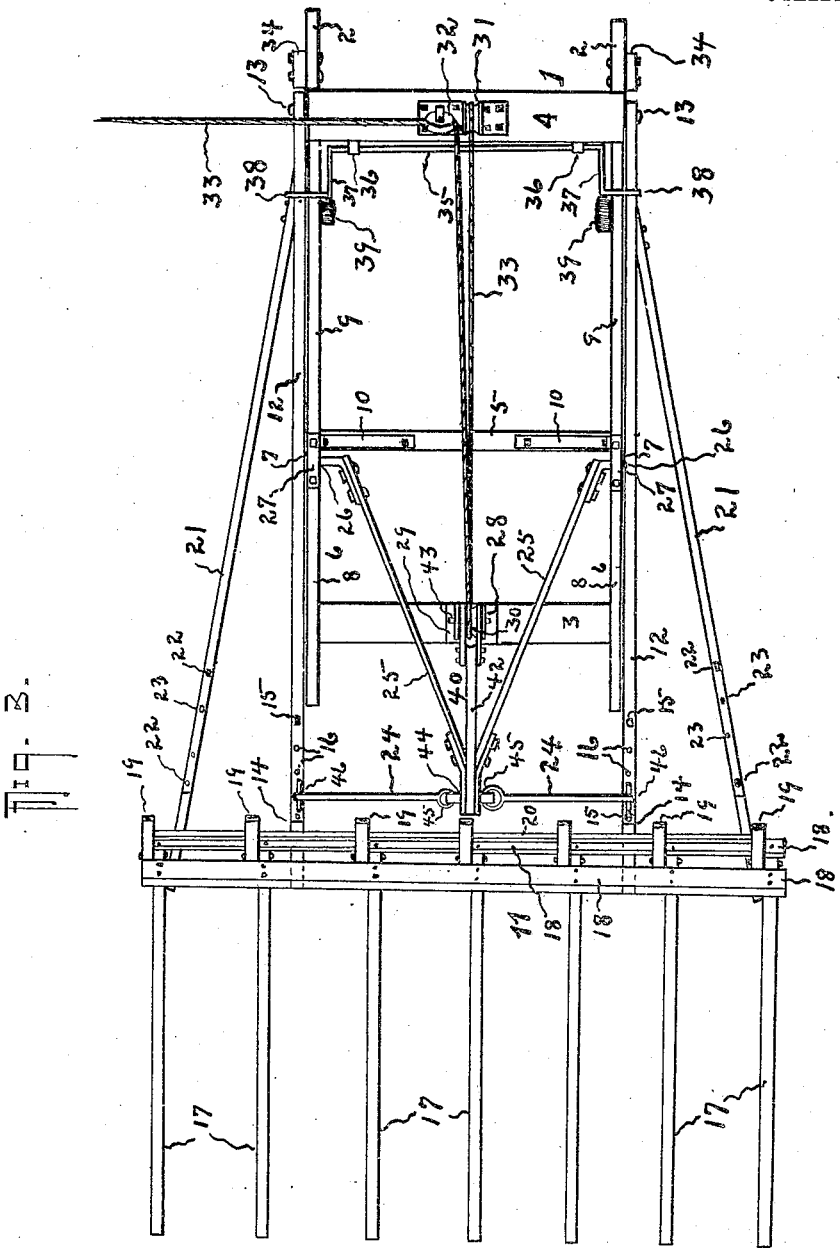

UNITED STATES PATENT OFFICE.

EDWARD G. CARTER, OF OMAHA, NEBRASKA.

HAY-STACKER.

938,461.  Specification of Letters Patent.  Patented Nov. 2, 1909.

Application filed February 25, 1909. Serial No. 480,041.

*To all whom it may concern:*

Be it known that I, EDWARD G. CARTER, a citizen of the United States, residing at Omaha, in the county of Douglas and State of Nebraska, have invented certain new and useful Improvements in Hay-Stackers, of which the following is a specification.

This invention relates to improvements in hay stackers, and has for its object the provision of a device of this class which will be effective for quickly moving large loads, will be durable in wear, and will comprise few and simple parts so that it may be economically constructed.

The invention also has reference to resilient means used in connection with contact or stop-blocks, whereby the fork will be thrown in a manner to impart a forward movement to the load at the time it is discharged from the fork.

With these and other objects in view the invention consists of a novel combination and arrangement of parts as described herein, pointed out by the claims and as illustrated in the drawing, wherein,—

Figures 1 and 2 are vertical, side views of the hay stacker, the fork being, respectively, in a lowered and raised position. Fig. 3 is a plan view of the hay stacker, the fork being in a lowered position.

Referring now to the drawing for a more particular description, numeral 1 indicates a frame upon which are mounted the movable parts of the stacker, and consists of the parallel side plates or skids 2 connected and secured adjacent each other by the transverse end-plates 3 and 4 and intermediate cross-plate 5.

I provide trusses 6, each comprising the vertical post 7 secured between the terminals of the side plates, somewhat nearer the rear than the front ends of said plates, and employ the pairs of truss plates 8 and 9 extending from posts 7, respectively, to the rear and to points near the front ends of plates 2 and secured to said plates; and braces 10 are used for sustaining posts 7, these braces being inclined and having their outer ends secured near the top of posts 7, upon truss-plates 9, their inner ends being secured upon cross-plate 5. As thus described frame 1 and parts thereon mounted may be conveniently drawn from one field to another to places where hay is to be stacked, plates 2 operating as sleigh-runners, and by reason of the bracing as mentioned, the parts are connected to reliably sustain the weight and stresses, as required.

I provide the hay fork 11 constructed rigid with its movable arms 12, these arms being pivotally mounted at 13 upon and near the front ends of plates 2. Arms 12 are adjustable as to length since they are spliced at 14, and bolts 15 may be seated in any of apertures 16 for shortening or lengthening these arms as may be desired, for elevating the hay to lesser or greater altitudes. The fork comprises the series of tines 17 secured at their inner ends upon the pair of strips 18, these strips being secured upon arms 12; strips 18 are parallel and are spaced apart sufficiently to receive therebetween the inner ends of the series of transverse tines 19. Tines 17 are substantially in alinement with arms 12 and are held to positions parallel with each other by reason of their mounting upon strips 18. The tines 19 are held parallel with relation to each other by means of the cross strip 20 secured intermediate the ends of said tines, the inner ends of these tines being secured upon tines 17. In operation, the fork swings upon its pivotal mounting from the position shown in Fig. 1 to the position shown in Fig. 2, the tines 17 being at all times at an obtuse angle to the tines 19. The containing capacity of the fork, while being loaded, is increased by this construction, and when the fork has been completely elevated, the tines 19 have a downward inclination as shown in Fig. 2 which facilitates unloading. It will also be seen that the strips 18 operate to sustain each series of tines in their angular relation, since they have bearings upon the tines 19 outwardly of the mountings of said tines 19 upon tines 17.

I provide the pair of side-braces 21, each being mounted at one of their ends upon and near the front ends of arms 12, and they are extended divergently to fork 11, their opposite ends being mounted upon and near the outer ends of strips 18, and by reason of the divergence of the braces, the fork, during its movements, is more firmly secured upon arms 12. Braces 21 are adjustable as to length by means of bolts 22 seated in apertures 23 thereof, and when the length of arms 12 is changed as above mentioned, a corresponding change in length may be made of the braces.

For the purpose of elevating the fork, devices are employed, now to be described. I provide the V-shaped frame 40, having at its apex the rods 24 pivotally mounted thereon at 45, and extended divergently therefrom to pivotal end-mountings 46 thereof upon arms 12, near strips 18. The ends of the divergent arms 25 of frame 40 are pivotally mounted at 26 in brackets 27, said brackets being secured upon the top of vertical posts 7.

I provide the standard or operating bar 28 of a length greater than that of the V-shaped frame, and having its lower end pivotally mounted at 41 in bracket 29, this bracket being secured upon and midway the length of cross-plate 3. Link 42 is employed, having one of its ends pivotally mounted at 43 upon the upper terminal of the operating-bar, its opposite end being pivotally mounted at 44 upon and at the apex of the V-shaped frame, and, from the description, it will be understood that a forwardly swinging movement of the upper end of operating-bar 28 will cause a forward swinging movement of the upper end of the V-shaped frame, and that the hay-fork will be elevated thereby since arms 12, by means of rods 24, are connected with the upper terminal of said V-shaped frame.

It will be noted that the hay-fork as shown, is unusually large in comparison with other parts, and this is a desired feature. Since the weight of the load is divided and sustained by the parts, as described, unusually large loads may be elevated, as will presently be seen, in the description of operation.

To operate the stacker, a pulley 30 may be mounted upon the outer end of operating-bar 28. Pulleys 31 and 32 are mounted upon and midway of cross-plate 4. A cable or rope 33 may be secured upon the outer end of bar 28, and from thence passed to engage the respective pulleys 31, 30 and 32, and power from any suitable exterior source may be employed for moving the cable and to, thereby, elevate the fork, the lowering thereof being effected by gravity.

In operation, tines 17, while hay is placed thereon rest upon the ground, and, of course, are horizontal; and at this time the front end of frame 1 is adjacent the stack to be formed. It will be understood that, during the upward swinging movement of the hay-fork, the weight of the load rests upon tines 17. As soon, however, or just before the fork reaches its greatest altitude, tines 19 are substantially horizontal and the weight rests thereon. At this time the front side of arms 12 engage the contact-blocks 34 which are secured upon and extend upward from the front ends of plates 2, and operate as stop-lugs to prevent any further forward movement of these arms or of the fork. To the end, however, that the load may be thrown forwardly as far as possible at the time it leaves the fork, and to the end that a backward or return movement be imparted to arms 12, resilient means are employed, reliable in operation, for the above purposes, said means comprising the rod 35 disposed parallel with and secured upon cross-plate 4, as by clips 36 and having its ends extended upward to form engaging-arms 37, with transverse indexes 38 disposed upon the plane traversed by arms 12. Coiled springs 39 are employed, each having one of its ends mounted upon plate 9, its opposite end being mounted upon one of arms 37. The normal position of arms 37 is an inclination inwardly or rearwardly of frame 1, and is held there from the force of the springs. When arms 12 are swinging forwardly they will forcibly engage indexes 38, and arms 37 will be swung to a vertical position, being moved by said arms 12. These arms will, by the resilient force of the springs, be thrown reversely at the moment said arms encounter blocks 34, thereby tending to impart a forward movement of the load and for the purpose of throwing the load forwardly from the fork, as far as possible.

Having fully described my invention, what I claim as new and desire to secure by Letters Patent is,—

1. In a device of the character described, the combination with a rectangularly formed supporting frame having an upstanding stop lug thereon upon each side thereof, a stacker head having longitudinally adjustable arms connected thereto, said arms being pivotally connected at each side of the frame adjacent said stops, a standard pivotally mounted upon and midway of the sides of the frame, a V shaped member having its arms pivotally mounted upon the sides of the frame, a link connecting the apex of each member with the longitudinally adjustable arms of the stacker head and standard, longitudinally adjustable braces extending from the stacker head to a point adjacent the pivoted portion of the longitudinally adjustable arms and being there rigidly connected to said arms, a rock shaft extending transversely of the frame, upwardly extending arms carried by said rock shaft, and outwardly extending indexes in which said arms terminate, and springs extending from the outer ends of said arms to a portion of the frame, substantially as shown and described.

2. In a device of the character described, the combination with a rectangularly formed supporting frame having an upstanding stop lug thereon upon each side thereof, a stacker head having longitudinally adjustable arms connected thereto, said arms being pivotally connected at each side of the frame adjacent said stops, a standard pivotally mounted upon and midway of the sides of the frame, a V shaped member having its arms pivotally mounted upon the sides of the frame, a link connecting the apex of each member with the longitudinally adjustable arms of the stacker head and standard, longitudinally adjustable braces extending from the stacker head to a point adjacent the pivoted portion of the longitudinally adjustable arms and being there rigidly connected to said arms, a rock shaft extending transversely of the frame, upwardly extending arms carried by said rock shaft and outwardly extending indexes in which said arms terminate, and springs extending from the outer ends of said arms to a portion of the frame, said stacker head comprising a series of tines extending in longitudinal alinement with the longitudinally adjustable arms and a second series of tines lying at an obtuse angle to the first series of tines.

In testimony whereof I have affixed my signature in presence of two witnesses.

EDWARD G. CARTER.

Witnesses:
 HIRAM A. STURGES,
 FANNIE B. COLBURN.